United States Patent
Chandrasekaran et al.

(10) Patent No.: US 7,299,378 B2
(45) Date of Patent: Nov. 20, 2007

(54) GEOGRAPHICALLY DISTRIBUTED CLUSTERS

(75) Inventors: Sashikanth Chandrasekaran, Belmont, CA (US); William F. Kehoe, Moss Beach, CA (US)

(73) Assignee: Oracle International Corporation, Redwood Shores, CA (US)

( * ) Notice: Subject to any disclaimer, the term of this patent is extended or adjusted under 35 U.S.C. 154(b) by 680 days.

(21) Appl. No.: 10/759,894

(22) Filed: Jan. 15, 2004

(65) Prior Publication Data

US 2005/0160315 A1 Jul. 21, 2005

(51) Int. Cl.
*G06F 11/00* (2006.01)

(52) U.S. Cl. ............... 714/15; 714/6; 714/16; 714/19

(58) Field of Classification Search ............ 714/5, 714/6, 15, 16, 19, 20; 711/161, 162; 707/204; 709/219

See application file for complete search history.

(56) References Cited

U.S. PATENT DOCUMENTS

| | | | |
|---|---|---|---|
| 5,530,855 | A | 6/1996 | Satoh et al. |
| 5,917,998 | A | 6/1999 | Cabrera et al. |
| 6,035,379 | A * | 3/2000 | Raju et al. .......... 711/162 |
| 6,144,999 | A | 11/2000 | Khalidi et al. |
| 6,163,856 | A | 12/2000 | Dion et al. |
| 6,505,307 | B1 | 1/2003 | Stell et al. |
| 6,643,795 | B1 | 11/2003 | Sicola et al. |
| 6,757,790 | B2 | 6/2004 | Chalmer et al. |
| 2002/0083036 | A1 | 6/2002 | Price |
| 2003/0014523 | A1 * | 1/2003 | Teloh et al. ............ 709/226 |
| 2003/0079019 | A1 | 4/2003 | Lolayekar et al. |
| 2003/0187861 | A1 | 10/2003 | Lubbers et al. |
| 2003/0188114 | A1 | 10/2003 | Lubbers et al. |
| 2004/0024979 | A1 * | 2/2004 | Kaminsky et al. .......... 711/162 |

FOREIGN PATENT DOCUMENTS

EP 1274012 A 6/2002

OTHER PUBLICATIONS

"RAM." Microsoft Computer Dicitonary (fifth edition). Copyright 2002. Microsoft Press.*
International Searching Authority, "Notification of Transmittal of the International Search Report and the Written Opinion of the International Searching Authority, or the Declaration," PCT/US2005/001057, dated May 24, 2006, 21 pages.

(Continued)

*Primary Examiner*—Bryce P. Bonzo
*Assistant Examiner*—Joseph D Manoskey
(74) *Attorney, Agent, or Firm*—Hickman Palermo Truong & Becker LLP

(57) ABSTRACT

A method and apparatus for mirroring data between a plurality of sites is provided. At a first site of the plurality of sites, a record is maintained that identifies which changes made to one or more data blocks that are stored at the first site have had associated redo information replicated to the other sites of the plurality of sites. A priority value associated with a transaction that is to be performed at the first site is determined. The transaction specifies a modification to a data block. Thereafter, if the priority value indicates that the transaction should not be lost if the first site becomes inoperable, then the transaction is committed only after the record indicates that all other changes that have updated the data block at the first site have had their respective redo information replicated to the other sites of the plurality of sites.

56 Claims, 10 Drawing Sheets

OTHER PUBLICATIONS

Frank, Lars, "Evaluation of Basic Remote Backup and Replication Methods for High Availability Databases," Software Practice and Experience, vol. 29, No. 15, Dec. 25, 1999, pp. 1339-1353., XP000873605.

Gray, Jim et al., "Transaction Processing: Concepts and Techniques," Transaction Processing: Concepts and Techniques, excerpts from chapter 9, 1993, pp. 493-525, XP002947548.

Gray, Jim et al., "Transaction Processing: Concepts and Techniques," Transaction Processing: Concepts and Techniques 1993, excerpts from chapter 10, 1993, pp. 546-548, 556-558, 713-714, XP002187740.

Garcia-Molina, Hector et al., "Coping with System Failure," *Database Systems: The Complete Book*—chapter 17, 2002, pp. 875-916, XP002379771.

Härder, Theo et al., "Logging und Recovery," *Datenbanksysteme Konzepte und Techniken der Implementierung*—chapter 15, 1999, pp. 455-497, XP002379770.

Lyon, Jim, "Design Consideration in Replicated Database Systems for Disaster Protection," Tandem Computer, Inc., IEEE Feb. 29, 1988, pp. 428-430, XP010011545.

International Searching Authority, "Notification of the Transmittal of the International Search Report and the Written Opinion of the International Searching Authority, or the Declaration," PCT/US2005/001056, dated Dec. 1, 2005, 14 pages.

Current Claims, PCT/US2005/001056, 5 pages.

Patent Cooperation Treaty, "Written Opinion of the International Preliminary Examining Authority," PCT/US2005/001057, dated Feb. 26, 2007, 14 pages.

\* cited by examiner

GEOGRAPHICALLY DISTRIBUTED CLUSTERS

RELATED APPLICATION

This application is related to U.S. patent application Ser. No. 10/760,013, filed concurrently herewith, titled "Cluster Database with Remote Data Mirroring," naming as inventors Sashikanth Chandrasekaran and William F. Kehoe, the entire disclosure of which is hereby incorporated by reference for all purposes as if fully set forth herein.

FIELD OF THE INVENTION

The present invention relates to mirroring data between a plurality of sites.

BACKGROUND OF THE INVENTION

Data mirroring is a technique wherein data is copied from a first location to one or more secondary locations contemporaneous with when the data is stored at the first location. The data copied from the first location to the one or more secondary locations is an exact copy of the data stored at the first location. Consequently, data mirroring is useful for both providing a backup of the mirrored data and recovering data after a disaster in a timely manner. Data mirroring is independent of whether data is being copied to a location that is either geographically close to or distant from the location being mirrored.

FIG. 1 is a block diagram illustrating a system 100 employing a first approach to data mirroring, wherein data stored at site A is being mirrored to site B. File server 130 synchronously replicates data stored in database 140 to database 142. Each time file server 130 processes a transaction issued by database server 120 that makes a change to a data block in database 140, file server 130 transmits a message reflecting the change to file server 132. Upon receiving the message, file server 132 updates data stored in database 142 to reflect the change made to database 140. Database 142 may be updated using a variety of techniques, such as either performing the same transaction to database 142 as was performed on database 140 or by updating non-volatile memory at database 142 to reflect the current state of data stored at database 140.

Clients, such as client 110 and client 112, may issue I/O requests to a database server to read or write data in a database. To ensure the consistency of databases 140 and 142, all clients in system 100 issue all I/O requests through database server 120 at site A, thus guaranteeing that all clients will have the same view of the data being mirrored, regardless of the site with which the client is associated.

The approach for data mirroring illustrated in FIG. 1 has several problems. First, all I/O requests from clients not associated with site A, such as client 112, may encounter a performance penalty because those clients must transmit their I/O request to a database server at a different site. Since all I/O requests from a client are routed through a single database server, which may be geographically distant from the requesting client, those clients who are located remotely may encounter a significant transmission delay associated with the I/O request. Further, the single database server will act as a bottleneck for all I/O requests from clients in system 100.

Second, if site A becomes inoperable, e.g., file server 130 crashes or becomes unavailable, then database server 120 and all clients in system 100 connecting to database server 120 will encounter a temporary loss of service until a backup system, such as site B, that replaces the failed system of site A becomes operational.

Third, in the event that file server 130 cannot replicate a write operation to file server 132, perhaps due to the communications link between file server 130 and file server 132 becoming inoperable, then care must be applied in determining whether database 140 or database 142 should be used as a backup system to recover from the encountered problem, as database 140 and 142 are no longer synchronized with each other since one or more write operations could not be replicated. A change made to a database will be lost if a database is chosen as a backup system and the chosen database does not reflect all write operations that have been performed on any database in the system.

FIG. 2 is a block diagram illustrating a second approach for data mirroring. As FIG. 2 depicts, each database stored at each site is partitioned into two or more partitions. For example, database 240 has partitions A and B', and database 242 has partitions A' and B. Data stored in partition A in database 240 is mirrored to partition A' in database 242, and data stored in partition B in database 242 is mirrored to partition B' in database 240. Database 240 is considered the primary site for partition A and database 242 is considered the primary site for partition B.

Requests from clients to write or read data may be performed locally (i.e., the client issuing the request and the database servicing the request are both in the same site) if and only if the request only involves data stored in the partition that is being mirrored at that site. For example, if client 210 issues a write or read request to a data block in partition A, then the request may be performed locally at database 240. However, if client 210 issues a write or read request to a data block in partition B, then database server 220 would route that request to file server 232 so the request can be performed at database 242. Partitioning data in this manner helps reduce the performance delay of processing a transaction against data in partitions where the primary site is the local site, although this technique does not reduce the performance delay of processing a transaction against data in partitions where the primary site is a remote site.

However, this approach is problematic if data cannot be replicated between sites or if a particular site becomes inoperable. When data cannot be replicated from a partition on a first site (the primary site) to a corresponding partition on a second site (the secondary site), the database at the primary site is not notified that the replication was not successful. As a result, partitions storing replicated data at the secondary site may grow stale and outdated. Thereafter, if the primary site becomes inoperable, then a partition storing replicated data at the secondary site cannot be used to recover from the inoperability of the primary site because the data stored therein is outdated. Use of the outdated data would violate database consistency principles.

Accordingly, there is an unaddressed need in the art to mirror data while avoiding the problems associated with the approaches described above.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and system for mirroring data between a plurality of sites are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Architecture Overview

Figure 1:
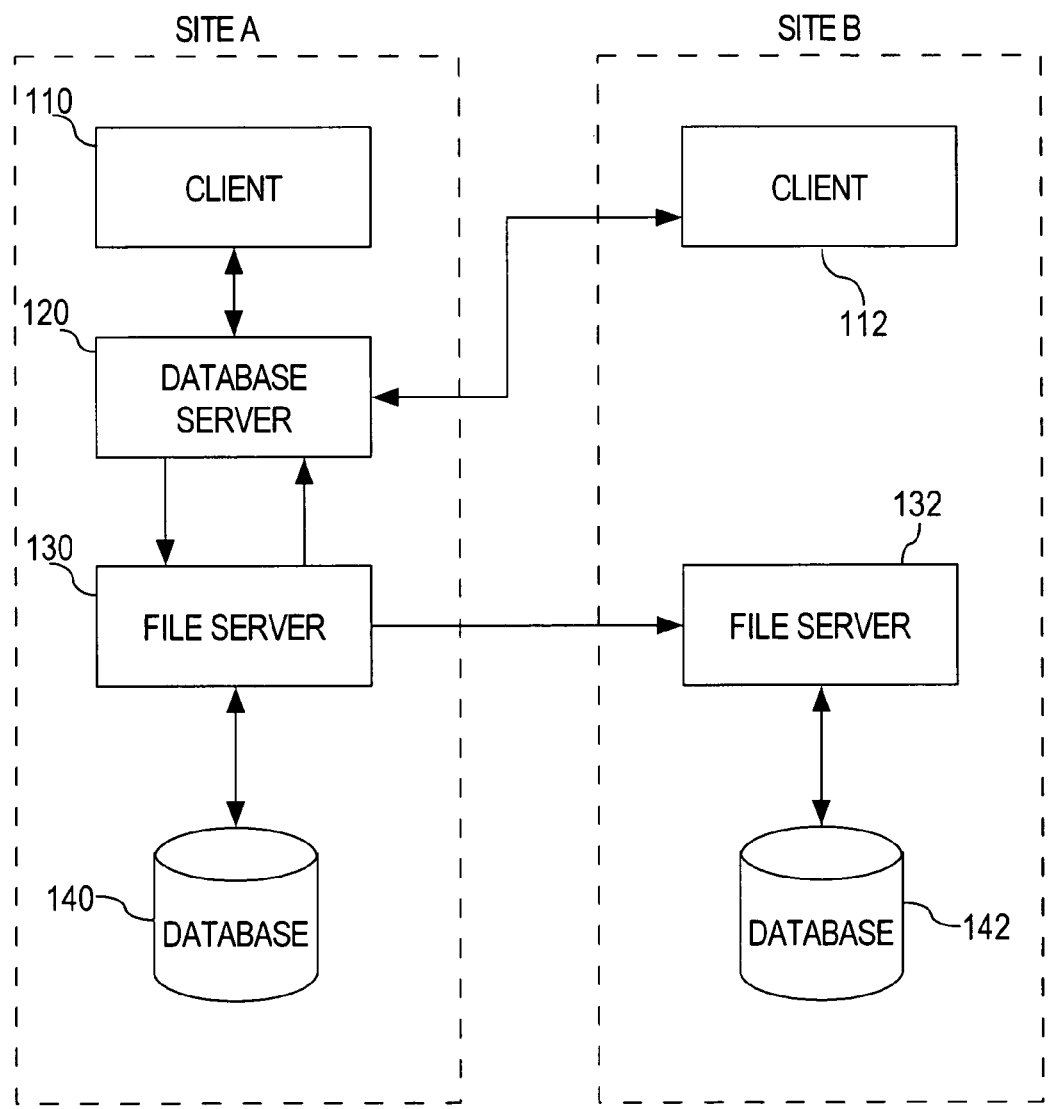
FIG. 1 is a block diagram illustrating a first approach to data mirroring.
Figure 2:
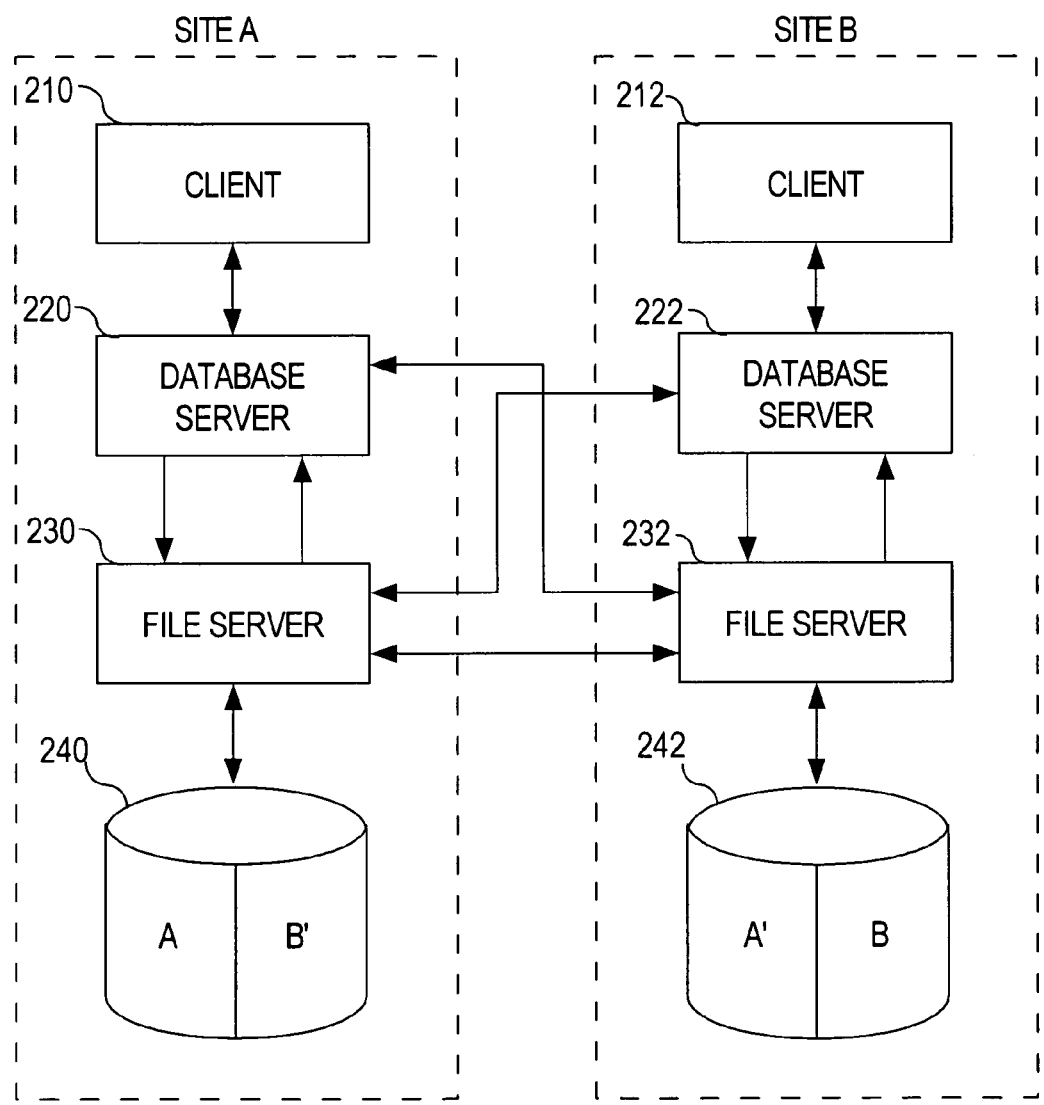
FIG. 2 is a block diagram illustrating a second approach to data mirroring.
Figure 3:
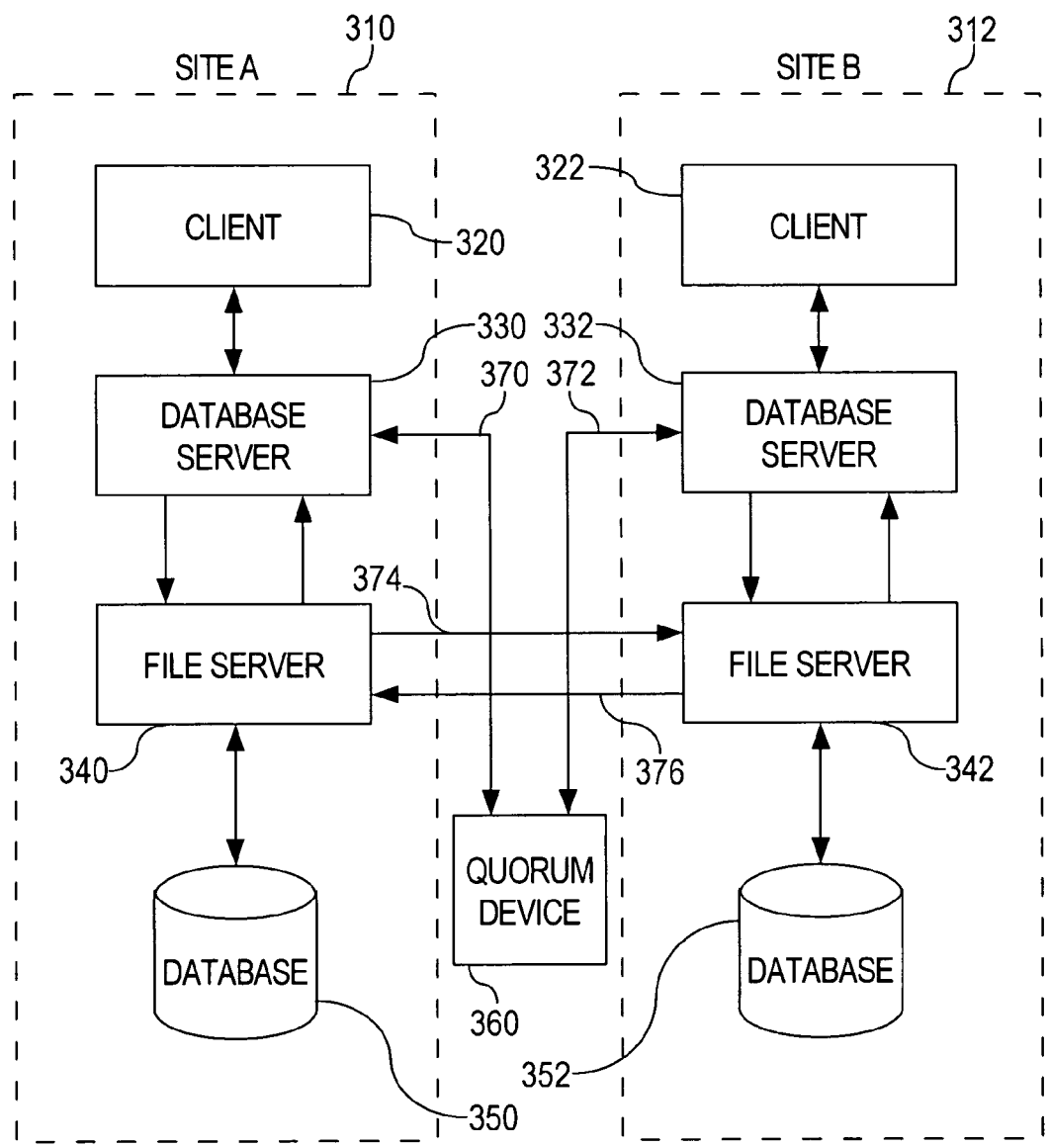
FIG. 3 is a block network diagram illustrating a data mirroring system according to an embodiment of the invention.

FIG. 3 is a block network diagram illustrating a data mirroring system 300 according to an embodiment of the invention. The data mirroring system 300 may be used to bi-directionally replicate data between each site in the data mirroring system 300. Additionally, as described herein, other benefits may be achieved using data mirroring system 300. The data mirroring system 300 of FIG. 3 includes site 310 and site 312, client 320 and client 322, database server 330 and database server 332, file server 340 and file server 342, database 350 and database 352, quorum device 360, and communications links 370, 372, 374, and 376.

A site, as broadly used herein, refers to a logical grouping of physical components in data mirroring system 300. Data may be replicated from a first site to a second site in data mirroring system 300. Numerous components of data mirroring system 300 may be stored in a single site. For example, a single site may have one or more clients, one or more database servers, one or more file servers, one or more databases, and one or more quorum devices. The logical grouping of physical components in a site may be physically located in areas of varying size. For example, a site may correspond to a particular building, a particular floor of a building, or a particular room of a building. Sites may also be physically close or distant to one other. For ease of explanation, FIG. 3 only depicts two sites; however, embodiments may have any number of sites, including only a single site.

A client, as broadly used herein, refers to any software or hardware component that is capable of issuing a request for a service. For example, a component that is capable of issuing a request to a database server is typically referred to as a database client. For ease of explanation, each site is illustrated with a single client in FIG. 3; however, a site may contain any number of clients. Non-limiting, illustrative examples of a client, such as client 320 and 322, include a software application, a personal computer, a machine capable of issuing requests to a database server, and a database server.

A database server, such as database server 330 and database server 332, is one or more software and/or hardware components used for managing data. Among other functions of database management, a database server typically governs and facilitates access to a database, and processes requests by database clients to access the database. While only two database servers, namely database server 330 and database server 332, are depicted in FIG. 3, any number of database servers may be employed in data mirroring system 300.

A file server, as broadly used herein, refers to any hardware or software component capable of performing file handling and storage functionality. A file server, such as file server 340 and file server 342, processes write and read operations that are received from a database server and that are performed on a database. Note that the term "file server" is used broadly herein, as a file server may include a system that executes separate from and independent of a database management system, or a module within a database management system.

A database, such as database 350 and database 352, is a durable store of electronic information. Non-limiting, illustrative examples of a database include a relational database, an object oriented database, a multidimensional database, a database in a distributed cluster of computers, and a database in a grid of server blades. A distributed cluster of database servers is explained in further detail in U.S. Pat. No. 6,353,836, which is incorporated herein by reference in its entirety. A grid on which a set of database servers is running is explained in further detail in U.S. Provisional Patent Application Ser. No. 60/500,050, which is incorporated herein by reference in its entirety.

A quorum device, as broadly used herein, refers to any hardware of software component that is capable of performing a membership voting operation. In an embodiment, a membership voting operation determines which database server(s) should be removed from a replication membership. The operation of a quorum device, such as quorum device 360, shall be explained in further detail below in the section entitled "Bi-Directional Replication." For ease of explanation, only one quorum device is depicted in FIG. 3; however, embodiments of data mirroring system 300 may include any number of quorum devices.

Communications links 370 and 372 may be implemented by any medium or mechanism that provides for the exchange of data between a database server, e.g., database server 330 or database server 332, and quorum device 360. Communications links 374 and 376 may be implemented by any medium or mechanism that provides for the exchange of data between file servers, e.g., file server 340 and file server 342. Examples of communications links 370, 372, 374, and 376 include, without limitation, a network such as a Local Area Network (LAN), Wide Area Network (WAN), Ethernet or the Internet, or one or more terrestrial, satellite or wireless links.

Error Handling in a Mirroring Environment—Overview

Methods and mechanisms are presented for mirroring data between a plurality of sites. According to one technique, a replication relationship is established between the plurality of sites, including a first site and a second site. In an embodiment, the replication relationship provides that at least some changes made at any site of the plurality of sites are replicated at each other site of the plurality of sites.

A first database server that is associated with the first site of the replication relationship requests performance of a write operation. Thereafter, the write operation is performed at the first site. A message is sent to request that the write operation be mirrored at the second site of the replication relationship.

For the purpose of explanation, it shall be assumed that the second site could not successfully perform the write operation. Consequently, the first database server receives an indication that the write operation could not be successfully performed at the second site. In response, the first database server initiates a membership voting operation to determine whether the first database server or a second database server associated with the second site should be removed from the replication membership.

In an embodiment, the first database server initiates the membership voting operation by communicating with a quorum device. A quorum device is a hardware or software component that is capable of performing a membership voting operation. The quorum device may determine which database server should be removed from the replication membership based on a number of factors, such as which database server is more important or more reliable. The quorum device may employ a variety of membership voting protocols to determine membership.

If it is determined that the second database server associated with the second site should be removed from the replication membership, then the first database server may send a message to a file server at the first site to indicate that write operations are no longer to be replicated at the second site. Additional embodiments are described in further detail below.

Priority-Based Commit Handling—Overview

Techniques are also provided for handling the commit of transactions based on priority values associated with the transactions. According to one technique, data is mirrored between a plurality of sites. At a first site of the plurality of sites, a first record is maintained that identifies which transactions that have been executed at the first site have had their redo information replicated to the other sites of the plurality of sites. Redo information, as broadly used herein, refers to information that describes a transaction. Also at the first site, a second record is maintained that identifies which transaction that have executed at the first site have had their redo information logged to persistent storage at the first site.

A priority value associated with a transaction that is to be performed at the first site is determined. The transaction specifies a modification to a data block. Redo information is typically stored in a redo log file. In most implementations, the redo log file stores redo information sequentially in the order in which transactions commit. Thus, ensuring that the redo information associated with a high priority transaction (a transaction with a priority value that indicates the transaction should not be lost if the site where it was issued becomes inoperable) has been replicated ensures that the redo information that is associated with a low priority transaction (a transaction with a priority value that indicates the transaction may be lost if the site where it was issued becomes inoperable) that has committed before the high priority transaction has also already been replicated.

If the priority value indicates that the transaction should not be lost if the first site becomes inoperable, then the transaction is committed only after the first record indicates that all other transactions that have committed before the transaction at the first site have had their respective redo information replicated to the other sites of the plurality of sites.

However, in an embodiment, if the priority value indicates that the transaction can be lost if the first site becomes inoperable, then the transaction is committed before the first record indicates that all other transactions that have committed before the transaction at the first site have had their respective redo information replicated to the other sites of the plurality of sites. In another embodiment, if the priority value indicates that the transaction can be lost if the first site becomes inoperable, then the transaction is committed after the second record indicates that all other transactions that have committed before the transaction at the first site have had their respective redo information stored to persistent storage at the first site.

Additional embodiments are described in further detail below.

Bi-Directional Replication

As explained in further detail below, embodiments support simultaneous local read operations and local write operations in each site of the system 300. Write operations may be replicated synchronously or asynchronously to each other site in the system 300. In an embodiment, the performance of a write operation may be enhanced by deferring the replication of the write operation to another site. For example, the replication of a write operation to another site may be deferred until a high priority transaction needs to commit or to a point where write-ahead logging or write-back logging needs to be preserved. The deferring of write operations allows the replication of the write operations to be batched efficiently.

Figure 4:
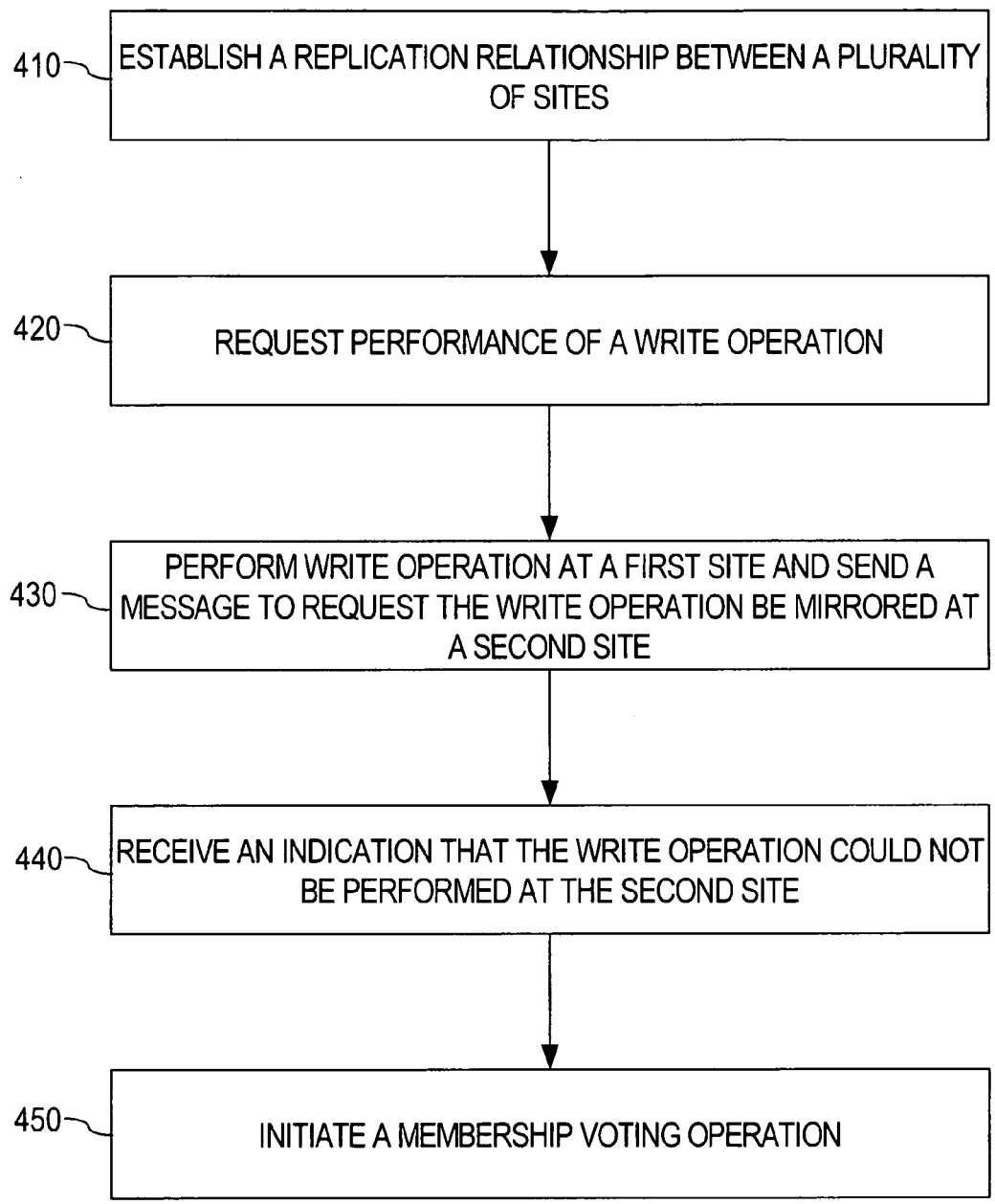
FIG. 4 is a flowchart illustrating the steps of mirroring data between a plurality of sites according to an embodiment.

FIG. 4 is a flowchart 400 illustrating the steps of mirroring data between a plurality of sites according to an embodiment. Initially, in step 410, a replication relationship is established between a plurality of sites. In an embodiment, a replication relationship is established for each site in data mirroring system 300, e.g., a replication relationship is established for site 310 and site 312 in FIG. 3. In an embodiment, the replication relationship provides that at least some changes made at any site in data mirroring system 300 is replicated at each other site in data mirroring system 300. After the performance of step 410, processing proceeds to step 420.

In step 420, a first database server associated with a first site in the plurality of sites requests performance of a write operation. In an embodiment, step 420 may be performed by database server 330, in site 310, requesting performance of a write operation. The write operation may be an operation to write data to a database located at the first site, such as database 350. After the performance of step 420, processing proceeds to step 430.

In step 430, the write operation that was requested in step 420 is performed at the first site. In an embodiment, the write operation may be performed at site 310 by database server 330 instructing file server 340 to perform the write operation at database 350, and thereafter file server 340 perform the write operation at database 350. Also in step 430, a message is sent to request that the write operation be mirrored at the second site. In an embodiment, file server 340 may send the request that the write operation be mirrored at site 312 to file server 342. After the performance of step 430, processing proceeds to step 440.

It is noted that write operations may be performed at each site in the system because each database server at each site uses a mechanism to ensure that no more than one write operation may change the same data block durably stored on disk at the same time. Such a mechanism could be implemented using a variety of techniques, which may include a form of global lock management (shared-disk clusters) or a partitioning of the disks (shared-nothing clusters).

In step 440, the first database server receives an indication that the write operation could not be successfully performed at the second site. For example, database server 330 receives an indication that the write operation could not be successfully performed at site 312. In an embodiment, the indication is an input/output error that indicates that a membership voting operation should be performed. The input/output error may be expressed using a unique error code that is received in a message by database server 330. The indication received at site 310 may be an input/output error that identifies that the write operation cannot be replicated at site 312. In an embodiment, the indication is only received in step 440 when the one site in the data mirroring system 300 does not reflect a write operation performed at another site in the data mirroring system 300; consequently, the indication of step 440 is not received by site 310 if database server 332 fails. In an embodiment, site 310 receives the indication of step 440 if file server 342 fails, database 352 fails, communications link 374 fails, or communications link 376 fails. After the performance of step 440, processing proceeds to step 450.

In step 450, the first database server initiates a membership voting operation to determine whether the first database server or a second database server associated with the second site should be removed from the replication membership. For example, step 450 may be performed by database server 330 initiating a membership voting operation to determine whether database server 330 or database server 332 should be removed from the replication membership.

In an embodiment, the first database server initiates the membership voting operation by communicating with a quorum device. For example, database server 330 initiates the membership voting operation by communicating over communications link 370 with quorum device 360.

Figure 5:
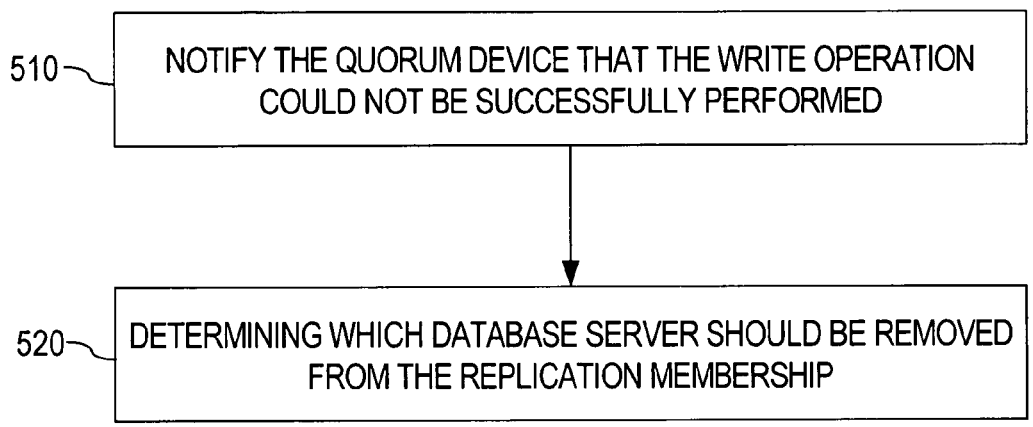
FIG. 5 is a flowchart illustrating the functional steps of initiating a membership voting operation according to an embodiment of the invention.

FIG. 5 is a flowchart illustrating the functional steps of initiating a membership voting operation according to an embodiment of the invention. In step 510, a quorum device is notified that the write operation could not be successfully performed. For example, step 510 may be performed by database server 330 notifying quorum device 360 over communications link 370 that the write operation could not be successfully performed at site 312. After the performance of step 510, processing proceeds to step 520.

In step 520, the quorum device notified in step 510 determines which database server should be removed from the replication membership. For example, step 520 may be performed by quorum device 360 determining which database server should be removed from the replication relationship. In an embodiment, the determination of which database server should be removed from the replication relationship includes determining which database server is more important or more reliable. If all database servers in the data mirroring system 300 are equally important or reliable, a default database server may be chosen by the quorum device.

In an embodiment, if quorum device 360 determines that database server 332 should be removed from the replication membership, then database server 330 sends a message to file server 340 that indicates write operations performed at site 310 are no longer to be replicated at site 312. Alternatively, if quorum device 360 determines that site 310 should be removed from the replication membership, then database server 332 informs file server 342 that data is no longer to be replicated at site 310. A file server can still process read and write operations locally even if the write operations are no longer replicated to a different site.

In an embodiment, quorum device 360 is comprised of a plurality of mirrored devices and step 510 is performed by a primary file server. The primary file server is a file server, associated with one of the plurality of sites, through which all other files servers, associated with other sites in the plurality of sites, communicate with the quorum device. For example, database server 330 may be a primary file server; consequently, database server 332 communicates with quorum device 360 through database sever 330.

In another embodiment, quorum device 360 is located in a different site associated with a different failure domain than any other site in the data mirroring system 300. In this embodiment, each database server in data mirroring system 300 may directly contact quorum device 360. However, if the quorum device 360 fails, then each site in data mirroring system 300 fails because each site cannot communicate with quorum device 360, even though those sites are otherwise healthy and have network and input/output connectivity with each other.

In an embodiment, a site may rejoin the replication relationship after the quorum device determines that a database server at the site should be removed from the replication membership. For example, if site 312 was removed from the replication relationship, then site 312 may rejoin the replication relationship. In response to site 312 rejoining the replication relationship, data in site 312 is resynchronized with data in site 310, and database 352 is remounted.

Improving the Performance of Writing Redo Information

Synchronous replication of write operations increases the latency and cost of write operations. File servers may also replicate write operations asynchronously, although care must be applied to coordinate write operations initiated elsewhere that have not yet been replicated and write operations that are about to issue. Numerous embodiments that advantageously employ asynchronous replication are discussed below.

Several embodiments that improve the performance of writing redo information through asynchronous replication shall be discussed below. Redo information, as broadly used herein, refers to information that describes a transaction. In an embodiment, redo information describes transaction that have committed or are about to commit. In an embodiment, redo information may be recorded in a redo log file. Redo information may be used in rolling back or "undoing" a transaction that has been committed.

Figure 6:
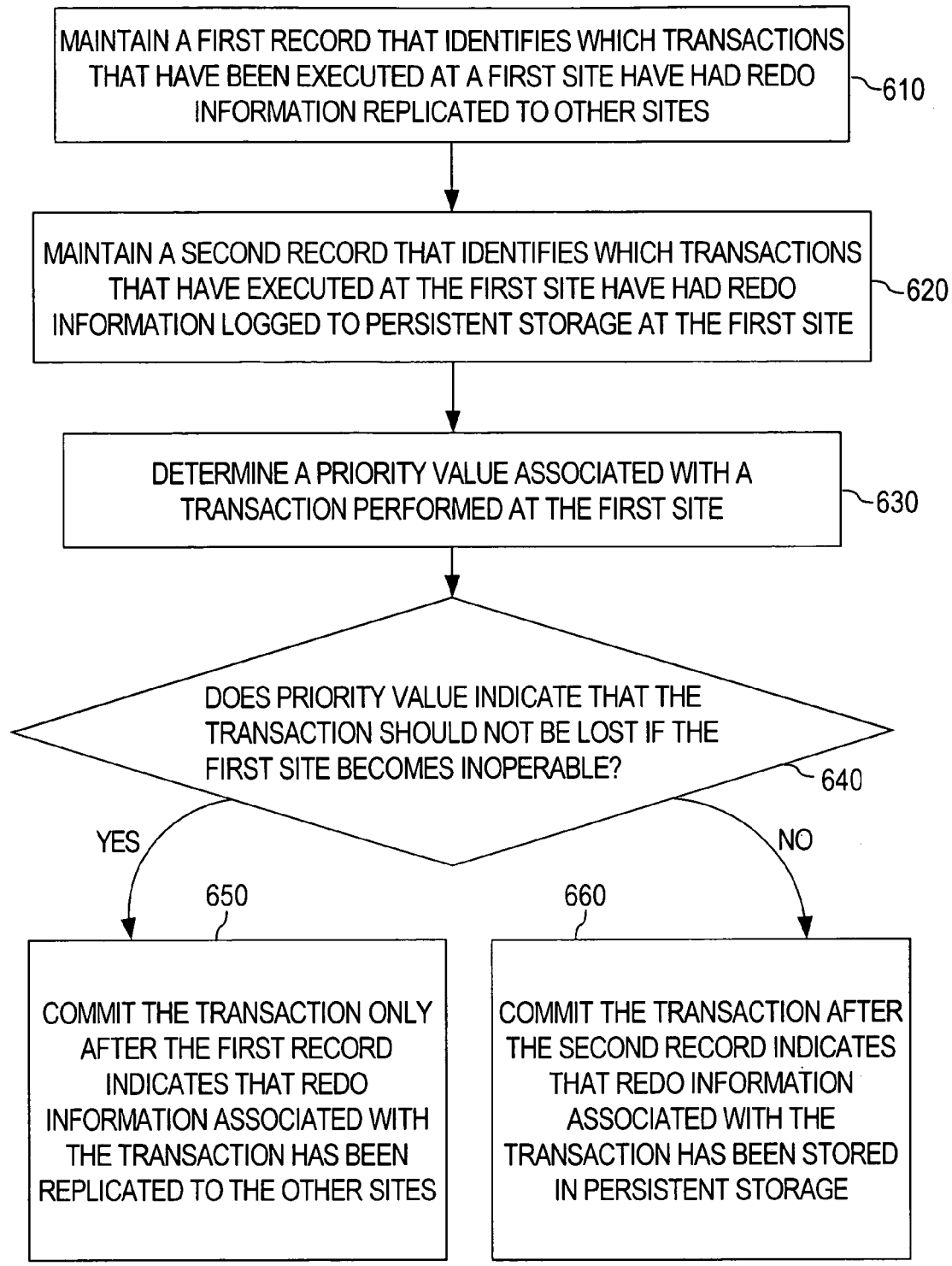
FIG. 6 is a flowchart illustrating the steps of mirroring data between a plurality of sites according to an embodiment of the invention.

FIG. 6 is a flowchart illustrating the steps of mirroring data between a plurality of sites according to an embodiment of the invention. The steps illustrated in FIG. 6 may be used to mirror redo information between a plurality of sites. Initially, in step 610, a first record is maintained, at a first site of the plurality of sites, that identifies which transactions that have been executed at the first site have had their redo information replicated to the other sites of the plurality of sites. Step 610 may be performed by database server 330 of site 310. In an embodiment, step 610 may be performed by identifying a portion of a redo log file. All transactions reflected in the identified portion of the redo log file of step 610 have been replicated to the other sites of the plurality of sites.

For example, the portion of the redo log file identified in step 610 may be identified by maintaining a record that identifies a particular transaction reflected in the redo log file that has had its respective redo information replicated to the other sites of the plurality of sites and is associated with the largest log sequence number (LSN). All transactions in the redo log file that have a LSN that is less than or equal to the LSN associated with the particular transaction are in the identified portion of the redo log file that have had their redo information replicated to the other sites of the plurality of sites. After the performance of step 610, processing proceeds to step 620.

In step 620, a second record is maintained, at a first site of the plurality of sites, that identifies which transactions that have been executed at the first site have had their redo information logged to persistent storage at the first site. Step 620 may be performed by database server 330 of site 310. In an embodiment, step 620 may be performed by identifying a portion of a redo log file. All transactions reflected in the identified portion of the redo log file of step 620 have been logged to persistent storage at the first site.

For example, the portion of the redo log file identified in step 620 may be identified by maintaining a record that identifies a particular transaction reflected in the redo log file that has had its respective redo information logged to persistent storage at the first site and is associated with the largest log sequence number (LSN). All transactions in the redo log file that have a LSN that is less than or equal to the LSN associated with the particular transaction are in the identified portion of the redo log file that have had their redo information logged to persistent storage at the first site. After the performance of step 620, processing proceeds to step 630.

In step 630, a priority value that is associated with a transaction is determined. The priority value may be used to determine when a transaction should be committed based on the importance of the transaction. For example, if a particular transaction should not be lost if the first site becomes inoperable, then the transaction may be given a higher priority value than a transaction that can be lost if the first site becomes inoperable.

In an embodiment, the transaction associated with the priority value of step 630 is to be performed at the first site. In an embodiment, the transaction specifies that a modification is to be made to at least one data block. A data block modified by the transaction may reside in the database 350 of site 310. For the ease of explanation, the transaction shall be discussed as modifying one data block, although a transaction may modify two or more data blocks. Step 630 may be performed by database server 330 of site 310. After the performance of step 630, processing proceeds to step 640.

In step 640, a determination is made as to whether the prior value indicates that the transaction should not be lost if the first site becomes inoperable. Step 640 may be performed by database server 330 of site 310.

If the determination of step 640 is positive (the priority value indicates that the transaction should not be lost if the first site becomes inoperable), then processing proceeds to step 650. In step 650, the transaction is committed only after the first record indicates that the redo information associated with the transaction has been replicated to each other site in data mirroring system 300. Step 650 maybe performed by database server 330 of site 310.

In an embodiment, the determination made in step 650 of whether redo information associated with the transaction has been replicated to the other sites of the plurality of sites is performed by comparing a commit record associated with the transaction to the first record.

If the determination of step 640 is negative (the priority value indicates that the transaction may be lost if the first site becomes inoperable), then processing proceeds to step 660. In step 660, the transaction is committed only after the second record indicates that the redo information associated with the transaction has been stored to persistent storage at the first site. Step 660 may be performed by database server 330 of site 310.

In an embodiment, the determination made in step 660 of whether the redo information associated with the transaction has been stored to persistent storage is performed by comparing a commit record associated with the transaction to the second record.

In an alternative embodiment (not depicted in FIG. 6), step 660 may be performed by committing the transaction before the first record indicates that the redo information associated with the transaction has been replicated to the other sites of the plurality of sites. In an embodiment, database server 330 of site 310 commits the transaction before the first record indicates that the redo information associated with the transaction has been replicated to the other sites of the plurality of sites. Redo information generated by a transaction is considered to be associated with the transaction.

The embodiments discussed above advantageously enable the determination of when to commit a transaction to be based on the importance of the transaction. For example, if a particular transaction is a very important transaction (it must not be lost under any circumstance), then the transaction is only committed after the first record indicates that all other transactions that have committed before the transaction have had their respective redo information replicated to the other sites. However, a transaction that is not as important may be committed after the second record indicates that all other transactions that have committed before the transaction have had their respective redo information stored to persistent storage at the first site. In this fashion, a transaction that is not as important may be committed earlier than a very important transaction, although the committed transaction that is not as important may be lost if first site becomes inoperable before the change associated with the committed transaction is mirrored in the other sites of the plurality of sites.

If the replication of a write operation is delayed and the particular site that issued the write operation becomes inoperable, then a surviving site must wait for all messages transmitted from the inoperable site to be received at each other site in the plurality of sites before initiating recovery of the site that is inoperable. This practice ensures that a message that has been sent from the inoperable site prior to that site becoming inoperable, and which has not yet been received, is not processed by the surviving site after it has initiated recovery or has completed recovery of the site that is inoperable. Alternately, the surviving sites may ignore any messages transmitted from the site that is inoperable after one or more of the surviving sites has initiated or completed recovery of the site that is inoperable.

Figure 7:
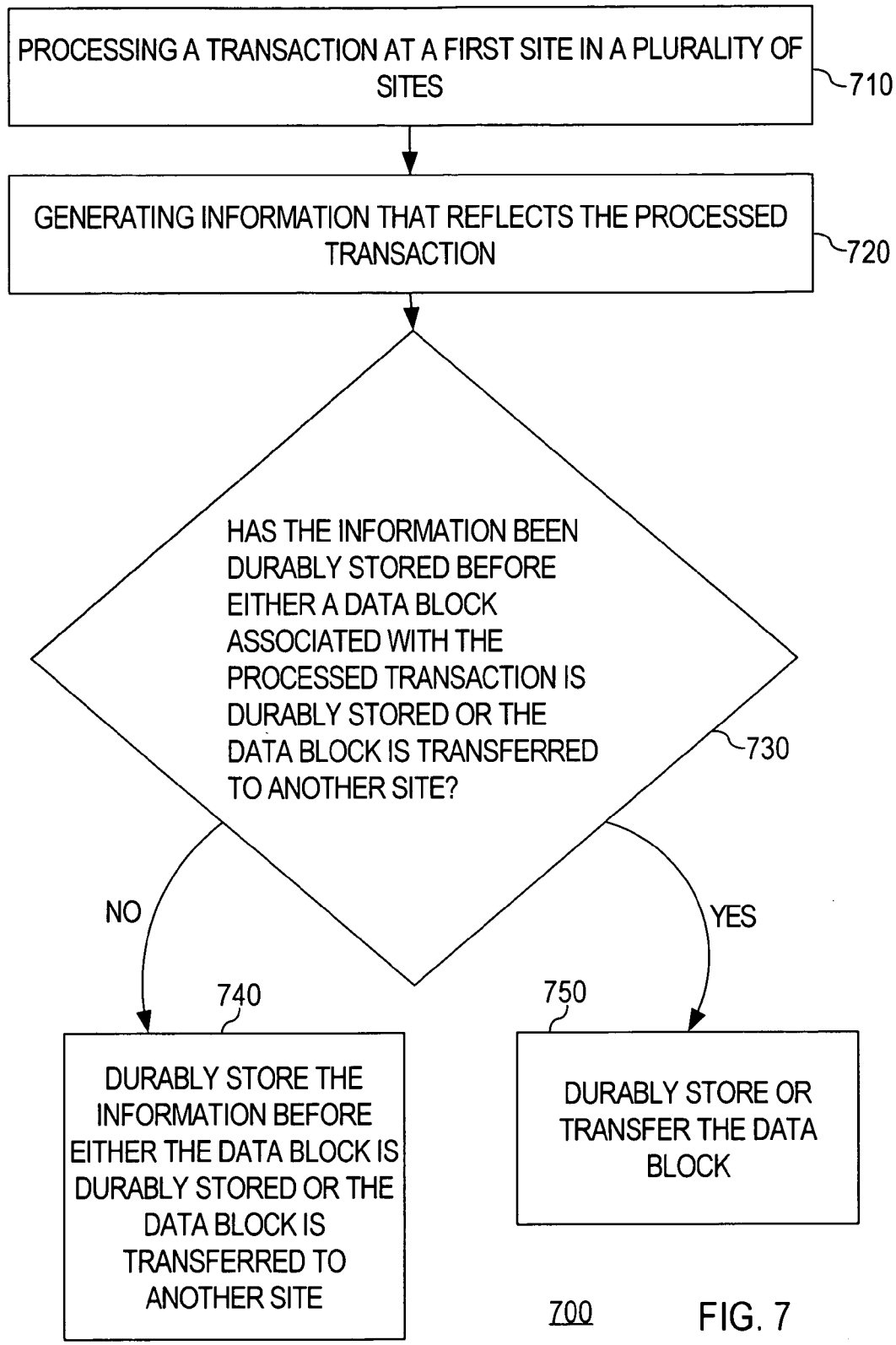
FIG. 7 is a flowchart illustrating the steps of mirroring data between a plurality of sites according to an embodiment of the invention.

FIG. 7 is a flowchart illustrating the steps of mirroring data between a plurality of sites according to an embodiment of the invention. The steps illustrated in FIG. 7 may be used to advantageously delay replication of a write operation to a redo log. It is advantageous for a database server to reduce the latency of writing data to a redo log. A database server can delay the replication of writes to a redo log provided the loss of the most recently committed transactions can be tolerated in the event of a site failure. Embodiments of the invention discussed below advantageously delay replication of writes to a redo log until a data block that reflects changes that have not been durably stored is either durably stored or transferred to another site.

Initially, in step 710, a transaction is processed at a first site in a plurality of sites. Step 710 may be performed by database server 330 of site 310 processing a transaction, such as a write operation.

In step 720, information is generated that reflects the processed transaction. The information may be generated in volatile memory. The information may include redo information about the processed transaction. Step 720 may be performed by database server 330 of site 310. After information is generated that reflects the processed transaction, processing proceeds to step 730.

In step 730, a determination is made as to whether the information generated in step 720 has been durably stored before either a data block associated with the processed transaction is durably stored or the data block is transferred to another site. Step 730 may be performed by database server 330 of site 310.

If the determination of step 730 is negative (the information generated in step 720 has not been durably stored before either a data block associated with the processed transaction is durably stored or the data block is transferred to another site), then processing proceeds to step 740. In step 740, the information generated in step 720 is durably stored before either the data block is durably stored or the data block is transferred to another site of the plurality of sites.

In an embodiment, step 740 may be performed such that information about multiple transactions is durably stored. For example, at the first site, a second transaction may be processed, and information may be generated in volatile memory at the first site that reflects the processed second transaction. If the information generated in step 720 (hereinafter the "first information") and the information that reflects the second transaction (hereinafter the "second information") has not been durably stored before either a second data block associated with the processed second transaction is durably stored or the second data block is transferred to another site of the plurality of sites, then the first information and the second information may be durably stored using a batch process before either the second data block is durably stored or the second data block is transferred to another site of the plurality of sites. In an embodiment, database server 330 durably stores the first information and the second information using a batch process. In an embodiment, the batch process may be asynchronous. The result of the asynchronous batch process may be determined using an input/output result descriptor, e.g., aio_result_t in UNIX. The asynchronous input/output result descriptor may be used to determine when the batch process has completed processing.

If the determination of step 730 is positive (the information generated in step 720 has been durably stored before either a data block associated with the processed transaction is durably stored or the data block is transferred to another site), then processing proceeds to step 750. In step 750, the data block associated with the processed transaction is durably stored or transferred.

Improving the Performance of Writing to Database Files

Figure 8:
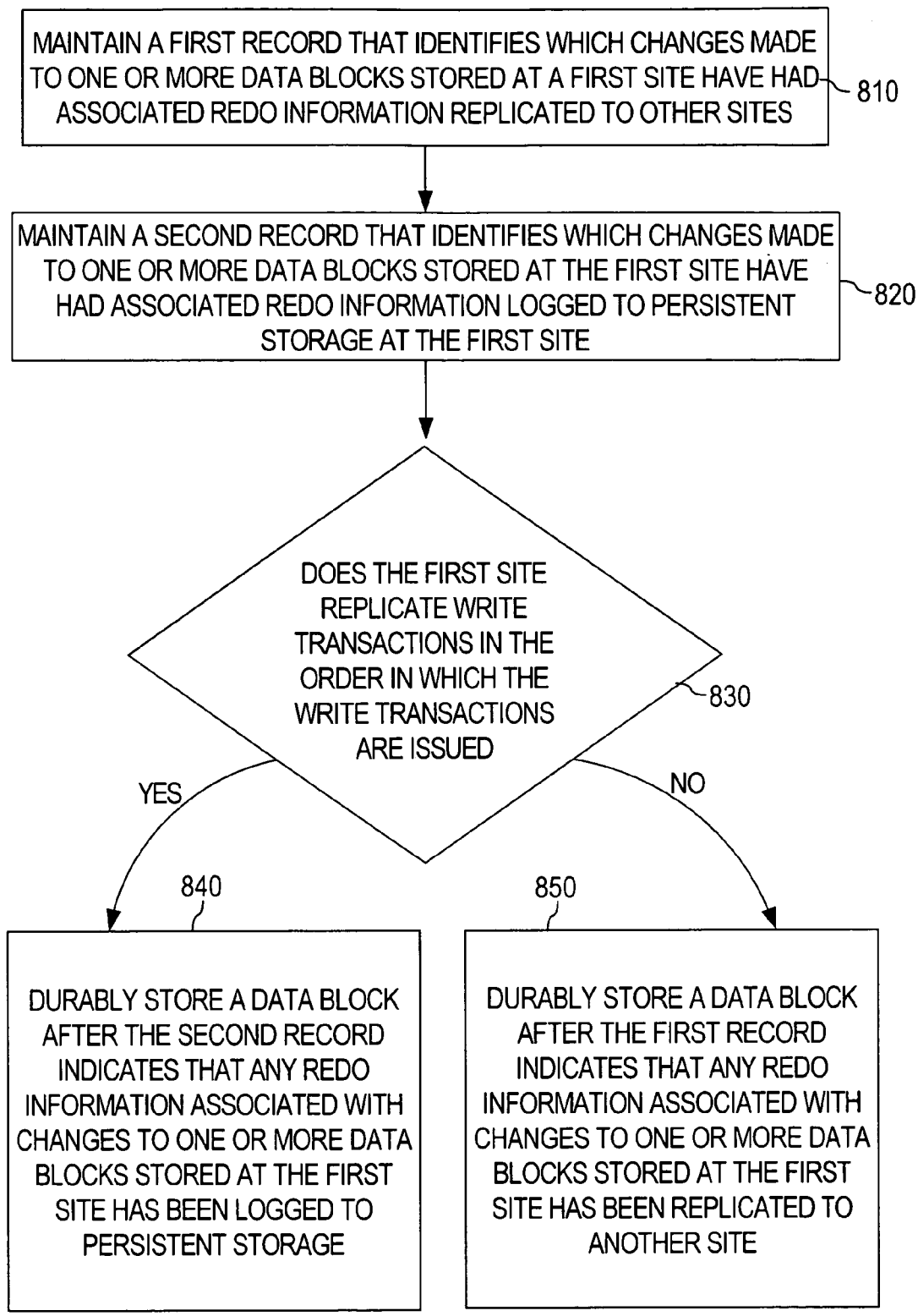
FIG. 8 is a flowchart illustrating the steps of mirroring data between a plurality of sites according to an embodiment of the invention.

Several embodiments that improve the performance of writing to database files through asynchronous replication shall be discussed below. FIG. 8 is a flowchart illustrating the steps of mirroring data between a plurality of sites according to an embodiment of the invention. The steps illustrated in FIG. 8 may be used to write to database files using a write-ahead logging scheme.

Initially, in step 810, a first record is maintained, at a first site of the plurality of sites, that identifies which changes made to one or more data blocks stored at the first site have had associated redo information replicated to the other sites of the plurality of sites. The first site implements a write-ahead logging scheme. In a write-ahead logging scheme, a data block in a buffer cache that reflects changes that are not durably stored (a "dirty" data block) is durably stored only after redo information associated with the one or more data blocks has been durably stored. In an embodiment, the first site replicates transactions to the other sites of the plurality of sites asynchronously relative to the execution of the transaction. Step 810 may be performed by database server 330 of site 310 maintaining a first record that identifies which changes made to one or more data blocks stored in database 350 at site 310 have had associated redo information replicated to site 312. The changes made to one or more data blocks that have associated redo information replicated to the other sites of the plurality of sites may be tracked by assigning each change to a log sequence number (LSN) in a redo log and storing the log sequence number of the most recent change that has been replicated. Additionally, the LSN associated with the last change that has been made to a particular data block is stored in the header of the particular data block. After the performance of step 810, processing proceeds to step 820.

In step 820, a second record is maintained, at a first site of the plurality of sites, that identifies which changes made to one or more data blocks stored at the first site have had associated redo information logged to persistent storage at the first site of the plurality of sites. The changes made to one or more data blocks that have associated redo information logged to persistent storage at the first site of the plurality of sites may be tracked by assigning each change to a log sequence number (LSN) in a redo log and storing the log sequence number of the most recent change that has been logged to persistent storage. Step 820 may be performed by database server 330 of site 310 maintaining a second record that identifies which changes made to one or more data blocks stored in database 350 at site 310 have had associated redo information logged to persistent storage at site 310. After the performance of step 820, processing proceeds to step 830.

In step 830, a determination is made as to whether the first site replicates write transactions in the same order in which the write transactions were issued at the first site. Database server 330 of site 310 may perform step 830.

If the determination of step 830 is positive (the first site does replicate write transactions in the same order in which the write transactions were completed at the first site), then processing proceeds to step 840. In step 840, a data block is durably stored after the second record indicates that any changes made to the one or more data blocks stored at the first site have had redo information logged to persistent storage. The changes made to the one or more data blocks may be performed by one or more transactions. Step 840 may be performed by durably storing a particular data block in database 350 after the second record indicates that that any changes made to the one or more data blocks stored in database 350 at site 310 have had associated redo information logged to persistent storage at site 310.

If the determination of step 830 is negative (the first site does not replicate write transactions in the same order in which the write transactions were completed at the first site), then processing proceeds to step 850. In step 850, a data block is durably stored after the first record indicates that any changes made to the one or more data blocks stored at the first site have had redo information replicated to the other sites of the plurality of sites. The changes made to the one or more data blocks may be performed by one or more transactions. Step 850 may be performed by durably storing a particular data block in database 350 in site 310 after the first record indicates that any changes made to the one or more data blocks stored in database 350 at site 310 have had associated redo information replicated to the other sites of the plurality of sites. After the first record indicates that changes made to a particular data block have been replicated to the other sites of the plurality of sites, then a lock associated with the data block may be released. Specifically, in a shared-disk or shared-cache cluster database, wherein concurrent access to a data block is coordinated using global lock management, the lock associated with a data block may be released only after the first record indicates that redo information associated with changes made to the data block has been replicated to the other sites of the plurality of sites. This ensures that any site that receives a data block from a remote site does not read or write the data block unless all the prior redo information associated with prior changes made to the data block is available in the site's local persistent storage.

Using the embodiment depicted in FIG. 8, if write operations to different files are replicated in the order in which the write operations are issued, then a particular data block may be durably stored as soon as the second record reflects all transactions that have updated the particular data block. In this manner, replication of the particular data block will occur only after the redo information associated with changes made to the particular data block by the one or more transactions has been replicated.

Figure 9:
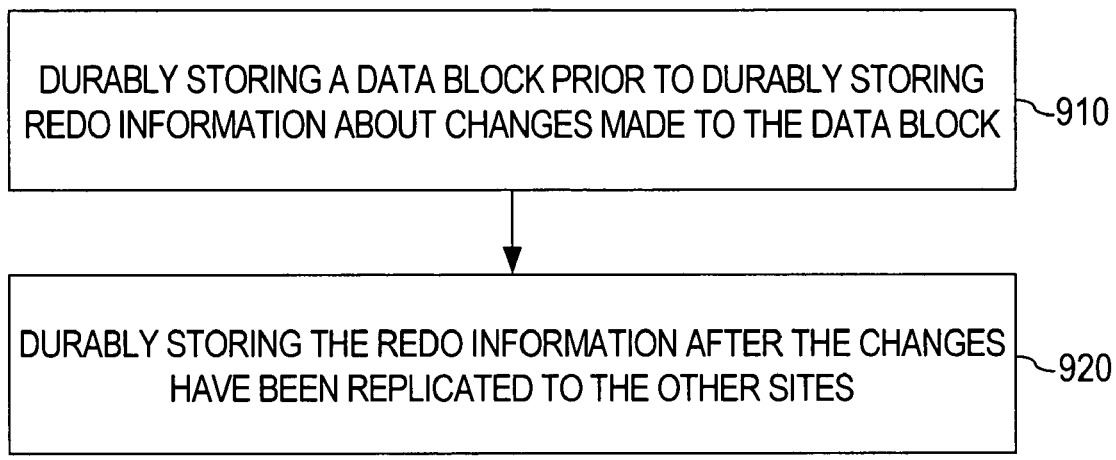
FIG. 9 is a flowchart illustrating the steps of mirroring data between a plurality of sites according to an embodiment of the invention.

Embodiments of the invention improve the performance of writing to database files using a write-back logging scheme. In a write-back logging scheme a data block is durably stored before redo information for the data block is generated. FIG. 9 is a flowchart illustrating the steps of mirroring data between a plurality of sites according to an embodiment of the invention. The steps illustrated in FIG. 9 may be used to write to database files using a write-back logging scheme. Initially, in step 910, at a first site of the plurality of sites, a data block is durably stored prior to durably storing redo information about changes made to the data block. Step 910 may be performed by database server 330 of site 310 durably storing a data block in database 350 prior to durably storing redo information about changes made to the data block. After the performance of step 910, processing proceeds to step 920.

In step 920, at the first site, the redo information reflecting changes made to the data block is durably stored after the changes have been replicated to the other sites in the plurality of sites. Step 920 may be performed by database server 330 of site 310 durably storing the redo information that reflects changes made to the data block after the changes have been replicated to site 312.

In an embodiment, in step 920, a determination is made as to when the changes made to the data block have been replicated to the other sites in the plurality of sites. In an embodiment, database server 330 of site 310 makes the determination as to when the changes made to the data block have been replicated to site 312.

In an embodiment, a single process may issue one or more transactions that each make changes to a data block. In another embodiment, the one or more transactions may be issued by two or more processes. Database server 330 may determine when the one or more transactions making changes to one or more data blocks have completed. After the one or more transactions making changes to one or more data blocks have completed, the one or more data blocks may be durably stored as described in step 910.

Using the steps illustrated in FIG. 9, a database server can wait until a file server completes the replication of all write operations to data blocks that have been durably stored before durably storing the redo information for the write operations. For example, database server 330 in site 310 can wait until file server 340 completes the replication to site 312 of all write operations to data blocks that have been durably stored at site 310 before database server 330 durably stores the redo information for the write operations in database 350.

Site Recovery

In an embodiment, if a particular site in data mirroring system 300 becomes inoperable, then recovery of the particular site is initiated after it is determined that all messages transmitted from the particular site to each other site in data mirroring system 300 have been received at their destination. For example, in the embodiment depicted in FIG. 3, if site 310 became inoperable, then recovery of site 310 is not initiated until after it is determined that all messages transmitted from site 310 to site 312 have been received at site 312. Alternately, the surviving sites may ignore any messages transmitted from the site that is inoperable after one or more of the surviving sites has initiated or completed recovery of the site that is inoperable.

Improving Performance of Writing to Temporary Files

Temporary files may be used by a database server in certain database operations, such as a sort and a hash join. The temporary files are used like a scratch pad to hold data for a limited duration. In some cases, the meta-data changes regarding the space allocation of temporary files needs to be replicated. However, if a temporary file is not needed by other sites of the plurality of sites, then the temporary file does not need to be replicated.

In an embodiment, a determination is made at a database server at a first site of a plurality of sites as to whether a data structure, such as a temporary file, is to be replicated to each other site of the plurality of sites. The data structure at the first site is replicated to each other site of the plurality of sites unless it is determined that the data structure is not to be replicated to each other site of the plurality of sites. For example, in the embodiment depicted in FIG. 3, database server 330 of site 310 may determine that a particular temporary file does not need to be replicated to site 312. Consequently, database server 330 does not replicate the temporary file to site 312.

Implementing Mechanisms

Figure 10:
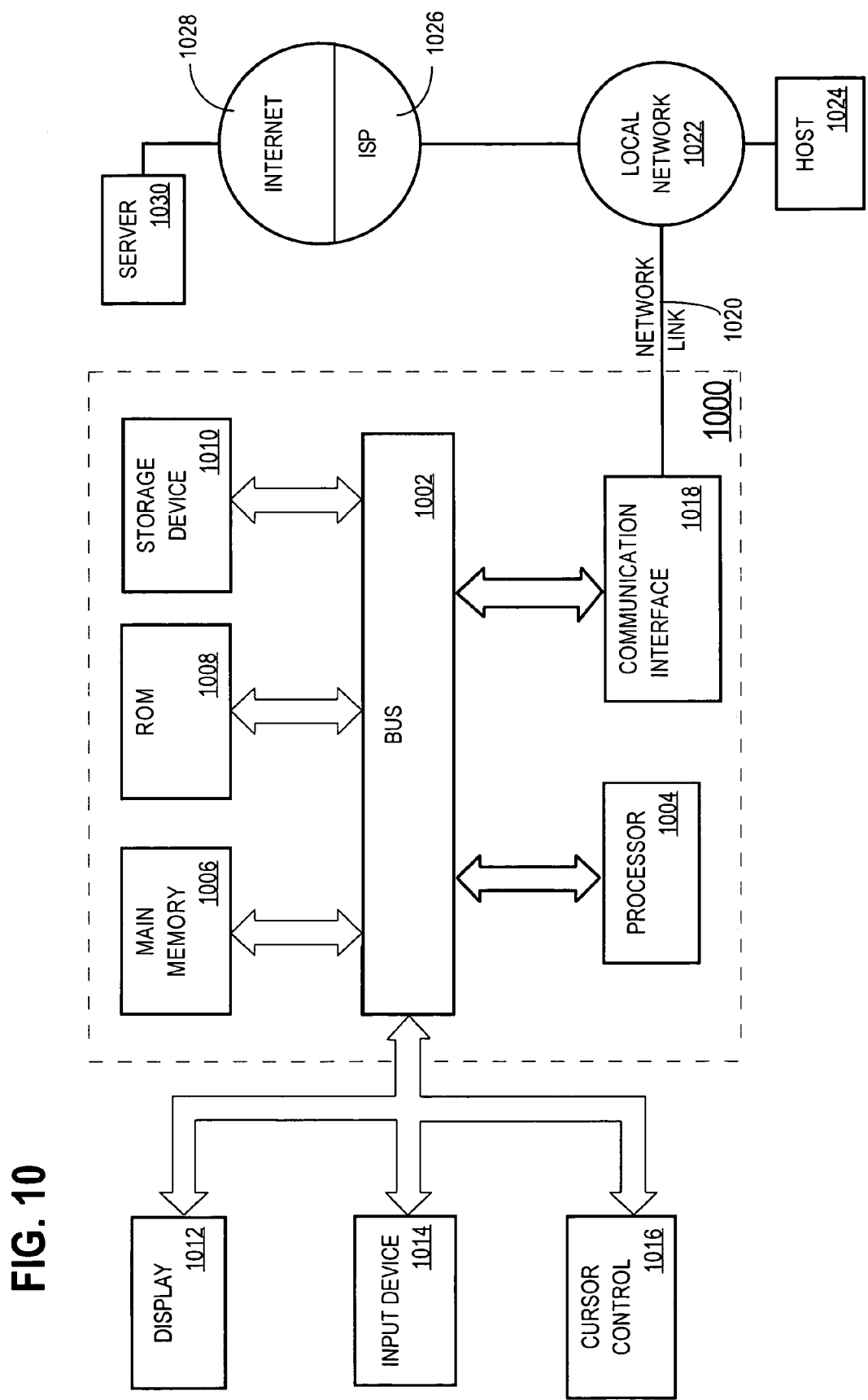
FIG. 10 is a block diagram that illustrates a computer system upon which an embodiment of the invention may be implemented.

FIG. 10 is a block diagram that illustrates a computer system 1000 upon which an embodiment of the invention may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for implementing the techniques described herein. According to one embodiment of the invention, those techniques are performed by computer system 1000 in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution. In this manner, computer system 1000 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for mirroring data between a plurality of sites, comprising:
    maintaining, at a first site of the plurality of sites, a record that identifies which transactions that have been executed at the first site have had their redo information replicated to the other sites of the plurality of sites;
    determining a priority value associated with a transaction that is to be performed at the first site, wherein the transaction specifies a modification to a data block;
    if the priority value is a first value in a set of possible values, then committing the transaction only after the record indicates that redo information associated with the transaction has been replicated to the other sites of the plurality of sites; and
    if the priority value is a second value in said set of possible values, then committing the transaction even though the record does not indicate that redo information associated with the transaction has been replicated to the other sites of the plurality of sites.

2. The method of claim 1, wherein the first value indicates that the transaction should not be lost if the first site becomes inoperable.

3. The method of claim 1, wherein the second value indicates the transaction can be lost if the first site becomes inoperable.

4. The method of claim 1, further comprising the step of:
    determining whether all other transactions that have committed before the transaction has committed have had their respective redo information replicated to the other sites of the plurality of sites by comparing a commit record associated with the transaction to the record.

5. The method of claim 1, wherein the record is a first record, and the method further comprises the step of:
    maintaining, at the first site, a second record that identifies which transactions that have executed at the first site have had their redo information logged to persistent storage at the first site.

6. The method of claim 5, further comprising the step of:
    if the priority value is the second value in the set of possible values, then committing the transaction after the second record indicates that the redo information generated by the transaction has been stored to persistent storage at the first site.

7. The method of claim 5, further comprising the step of:
    determining which transactions that have executed at the first site have had their redo information logged to persistent storage by comparing a commit record associated with the transaction to the second record.

8. The method of claim 5, wherein the second record identifies which transactions that have executed at the first site have had their redo information logged to persistent storage at the first site by identifying a portion of a redo log file, and wherein all transactions reflected in the identified portion of the redo log file have been logged to persistent storage at the first site.

9. The method of claim 1, further comprising the step of:
    if the priority value is the second value in the set of possible values, then committing the transaction before the record indicates that the redo information generated by the transaction has been replicated to the other sites of the plurality of sites.

10. The method of claim 1, further comprising the step of:
    if a particular site of the plurality of sites becomes inoperable, then initiating recovery of the particular site after it is determined that all messages transmitted from the particular site to each other site of the plurality of sites have been received at their destination.

11. The method of claim 1, further comprising the steps of:
    at each site of the plurality of sites, determining if a data structure is to be replicated to each other site of the plurality of sites; and
    replicating the data structure to each other site of the plurality of sites unless it is determined that the data structure is not to be replicated to each other site of the plurality of sites.

12. The method of claim 1, wherein the record identifies which transactions that have been executed at the first site have had their redo information replicated to the other sites of the plurality of sites by identifying a portion of a redo log file, and wherein all transactions reflected in the identified portion of the redo log file have been replicated to the other sites of the plurality of sites.

13. A method for storing data, comprising:
    at a first site in a plurality of sites, processing a transaction;
    generating in volatile memory redo information for the processed transaction;
    delaying storing the redo information to durable storage as long as (1) a data block associated with the processed transaction is not durably stored and (2) the data block is not transferred to another site of the plurality of sites; and
    storing the redo information to the durable storage in response to detecting that (1) the data block is about to be durably stored or (2) the data block is about to be transferred to another site of the plurality of sites.

14. The method of claim 13, wherein the data block is a first data block, wherein the transaction is a first transaction, the redo information is first redo information, and the method further comprises the steps of:
    at the first site, processing a second transaction;
    generating in the volatile memory second redo information for the processed second transaction;
    delaying storing the first redo information and the second redo information to the durable storage as long as (1) the first data block and a second data block associated with the processed second transaction are not durably stored and (2) the first data block and the second data block are not transferred to another site of the plurality of sites; and
    storing, using a batch process, the first redo information and the second redo information to the durable storage in response to detecting that (1) the first data block or the second data block is about to be durably stored or (2) the first data block or the second data block is about to be transferred to another site of the plurality of sites.

15. The method of claim 14, further comprising the step of:
determining whether the batch process has completed durably storing the first redo information and the second redo information.

16. A method for mirroring data between a plurality of sites, comprising:
maintaining, at a first site of the plurality of sites, a record that identifies which changes made to one or more data blocks stored at the first site have had associated redo information replicated to the other sites of the plurality of sites, wherein the first site implements a write-ahead logging scheme;
determining if the first site replicates, to the other sites of the plurality of sites, write transactions that are executed at the first site in the order in which the write transactions were issued; and
if the first site does not replicate, to the other sites of the plurality of sites, write transactions that are executed at the first site in the order in which the write transactions were issued, then durably storing a data block, in the one or more data blocks, associated with a transaction only after the record indicates that any write transactions that have updated the data block at the first site have had their respective redo information replicated to the other sites of the plurality of sites.

17. The method of claim 16, wherein the record is a first record, and further comprising the steps of:
maintaining, at the first site, a second record that identifies which changes made to the one or more data blocks stored at the first site have had associated redo information logged to persistent storage at the first site; and
if the first site does replicate, to the other sites of the plurality of sites, write transactions that are executed at the first site in the order in which the write transactions were issued, then durably storing the data block after the second record indicates that any write transactions that have updated the data block at the first site have had their respective redo information logged to persistent storage at the first site.

18. The method of claim 17, wherein the first site replicates write transactions to the other sites of the plurality of sites asynchronously to the completion of the write transaction at the first site.

19. The method of claim 17, wherein the second record identifies which changes are made to the one or more data blocks stored at the first site have had associated redo information logged to persistent storage by identifying a portion of a redo log file, and wherein all changes in the identified portion of the redo log file have been logged to persistent storage.

20. The method of claim 16, further comprising the step of:
releasing a lock associated with the data block after the first record indicates that redo information associated with changes made to the data block has been replicated to the other sites of the plurality of sites.

21. The method of claim 16, further comprising the step of:
if a particular site of the plurality of sites becomes inoperable, then initiating recovery of the particular site after it is determined that all messages transmitted from the particular site to each other site of the plurality of sites have been received at their destination.

22. The method of claim 16, further comprising the steps of:
at each site of the plurality of sites, determining if a data structure is to be replicated to each other site of the plurality of sites; and
replicating the data structure to each other site of the plurality of sites unless it is determined that the data structure is not to be replicated to each other site of the plurality of sites.

23. The method of claim 16, wherein the record identifies which changes are made to the one or more data blocks stored at the first site have had associated redo information replicated to the other sites of the plurality of sites by identifying a portion of a redo log file, and wherein all changes in the identified portion of the redo log file have been replicated to the other sites of the plurality of sites.

24. A method for minoring data between a plurality of sites, wherein the plurality of sites includes a first site, comprising:
at the first site, durably storing a data block prior to durably storing redo information about changes made to the data block; and
at the first site, durably storing the redo information after the changes have been replicated to the other sites in the plurality of sites.

25. The method of claim 24, wherein the data block is in a plurality of data blocks, wherein changes made to the plurality of data blocks are performed by transactions issued by a single process, and further comprising the step of:
determining if a set of transactions issued by the single process have completed, wherein the set of transactions made the changes to the plurality of data blocks.

26. The method of claim 24, wherein the data block is in a plurality of data blocks, wherein changes made to the plurality of data blocks are performed by transactions issued by two or more processes, and further comprising the step of:
determining when the changes have been replicated to the other sites in the plurality of sites.

27. The method of claim 24, further comprising the step of:
if a particular site of the plurality of sites becomes inoperable, then initiating recovery of the particular site after it is determined that all messages transmitted from the particular site to each other site of the plurality of sites have been received at their destination.

28. The method of claim 24, further comprising the steps of:
at each site of the plurality of sites, determining if a data structure is to be replicated to each other site of the plurality of sites; and
replicating the data structure to each other site of the plurality of sites unless it is determined that the data structure is not to be replicated to each other site of the plurality of sites.

29. A machine-readable medium carrying one or more sequences of instructions for mirroring data between a plurality of sites, wherein the machine-readable medium is one of a volatile medium or a non-volatile medium, wherein execution of the one or more sequences of instructions by one or more processors causes the one or more processors to perform the steps of:
maintaining, at a first site of the plurality of sites, a record that identifies which transactions that have been executed at the first site have had their redo information replicated to the other sites of the plurality of sites;

determining a priority value associated with a transaction that is to be performed at the first site, wherein the transaction specifies a modification to a data block;

if the priority value is a first value in a set of possible values, then committing the transaction only after the record indicates that redo information associated with the transaction has been replicated to the other sites of the plurality of sites; and if the priority value is a second value in said set of possible values, then committing the transaction even though the record does not indicate that redo information associated with the transaction has been replicated to the other sites of the plurality of sites.

30. The machine-readable medium of claim 29, wherein the first value indicates that the transaction should not be lost if the first site becomes inoperable.

31. The machine-readable medium of claim 29, wherein the second value indicates the transaction can be lost if the first site becomes inoperable.

32. The machine-readable medium of claim 29, wherein execution of the one or more sequences of instructions by the one or more processors causes the one or more processors to further perform the step of:

determining whether all other transactions that have committed before the transaction has committed have had their respective redo information replicated to the other sites of the plurality of sites by comparing a commit record associated with the transaction to the record.

33. The machine-readable medium of claim 29, wherein the record is a first record, and wherein execution of the one or more sequences of instructions by the one or more processors causes the one or more processors to further perform the step of:

maintaining, at the first site, a second record that identifies which transactions that have executed at the first site have had their redo information logged to persistent storage at the first site.

34. The machine-readable medium of claim 33, wherein execution of the one or more sequences of instructions by the one or more processors causes the one or more processors to further perform the step of:

if the priority value is the second value in the set of possible values, then committing the transaction after the second record indicates that the redo information generated by the transaction has been stored to persistent storage at the first site.

35. The machine-readable medium of claim 33, wherein execution of the one or more sequences of instructions by the one or more processors causes the one or more processors to further perform the step of:

determining which transactions that have executed at the first site have had their redo information logged to persistent storage by comparing a commit record associated with the transaction to the second record.

36. The machine-readable medium of claim 33, wherein the second record identifies which transactions that have executed at the first site have had their redo information logged to persistent storage at the first site by identifying a portion of a redo log file, and wherein all transactions reflected in the identified portion of the redo log file have been logged to persistent storage at the first site.

37. The machine-readable medium of claim 29, wherein execution of the one or more sequences of instructions by the one or more processors causes the one or more processors to further perform the step of:

if the priority value is the second value in the set of possible values, then committing the transaction before the record indicates that the redo information generated by the transaction has been replicated to the other sites of the plurality of sites.

38. The machine-readable medium of claim 29, wherein execution of the one or more sequences of instructions by the one or more processors causes the one or more processors to further perform the step of:

if a particular site of the plurality of sites becomes inoperable, then initiating recovery of the particular site after it is determined that all messages transmitted from the particular site to each other site of the plurality of sites have been received at their destination.

39. The machine-readable medium of claim 29, wherein execution of the one or more sequences of instructions by the one or more processors causes the one or more processors to further perform the steps of:

at each site of the plurality of sites, determining if a data structure is to be replicated to each other site of the plurality of sites; and replicating the data structure to each other site of the plurality of sites unless it is determined that the data structure is not to be replicated to each other site of the plurality of sites.

40. The machine-readable medium of claim 29, wherein the record identifies which transactions that have been executed at the first site have had their redo information replicated to the other sites of the plurality of sites by identifying a portion of a redo log file, and wherein all transactions reflected in the identified portion of the redo log file have been replicated to the other sites of the plurality of sites.

41. A machine-readable medium carrying one or more sequences of instructions for storing data, wherein the machine-readable medium is one of a volatile medium or a non-volatile medium, wherein execution of the one or more sequences of instructions by one or more processors causes the one or more processors to perform the steps of:

at a first site in a plurality of sites, processing a transaction;

generating in volatile memory redo information for the processed transaction;

delaying storing the redo information to durable storage as long as (1) a data block associated with the processed transaction is not durably stored and (2) the data block is not transferred to another site of the plurality of sites; and storing the redo information to the durable storage in response to detecting that (1) the data block is about to be durably stored or (2) the data block is about to be transferred to another site of the plurality of sites.

42. The machine-readable medium of claim 41, wherein the data block is a first data block, wherein the transaction is a first transaction, the redo information is a first redo information, and wherein execution of the one or more sequences of instructions by the one or more processors causes the one or more processors to further perform the steps of:

at the first site, processing a second transaction;

generating in the volatile memory second redo information for the processed second transaction;

delaying storing the first redo information and the second redo information to the durable storage as long as (1) the first data block and a second data block associated with the processed second transaction are not durably stored and (2) the first data block and the second data block are not transferred to another site of the plurality of sites; and storing, using a batch process, the first redo information and the second redo information to the durable storage in response to detecting that (1) the first data block or the second data block is about to be durably stored or (2) the first data block or the second data block is about to be transferred to another site of the plurality of sites.

43. The machine-readable medium of claim 42, wherein execution of the one or more sequences of instructions by the one or more processors causes the one or more processors to further perform the step of:
determining whether the batch process has completed durably storing the first redo information and the second redo information.

44. A machine-readable medium carrying one or more sequences of instructions for mirroring data between a plurality of sites, wherein the machine-readable medium is one of a volatile medium or a non-volatile medium, wherein execution of the one or more sequences of instructions by one or more processors causes the one or more processors to perform the steps of:
maintaining, at a first site of the plurality of sites, a record that identifies which changes made to one or more data blocks stored at the first site have had associated redo information replicated to the other sites of the plurality of sites, wherein the first site implements a write-ahead logging scheme;
determining if the first site replicates, to the other sites of the plurality of sites, write transactions that are executed at the first site in the order in which the write transactions were issued; and
if the first site does not replicate, to the other sites of the plurality of sites, write transactions that are executed at the first site in the order in which the write transactions were issued, then durably storing a data block, in the one or more data blocks, associated with a transaction only after the record indicates that any write transactions that have updated the data block at the first site have had their respective redo information replicated to the other sites of the plurality of sites.

45. The machine-readable medium of claim 44, wherein the record is a first record, and wherein execution of the one or more sequences of instructions by the one or more processors causes the one or more processors to further perform the steps of:
maintaining, at the first site, a second record that identifies which changes made to the one or more data blocks stored at the first site have had associated redo information logged to persistent storage at the first site; and
if the first site does replicate, to the other sites of the plurality of sites, write transactions that are executed at the first site in the order in which the write transactions were issued, then durably storing the data block after the second record indicates that any write transactions that have updated the data block at the first site have had their respective redo information logged to persistent storage at the first site.

46. The machine-readable medium of claim 45, wherein the first site replicates write transactions to the other sites of the plurality of sites asynchronously to the completion of the write transaction at the first site.

47. The machine-readable medium of claim 45, wherein the second record identifies which changes are made to the one or more data blocks stored at the first site have had associated redo information logged to persistent storage by identifying a portion of a redo log file, and wherein all changes in the identified portion of the redo log file have been logged to persistent storage.

48. The machine-readable medium of claim 44, wherein execution of the one or more sequences of instructions by the one or more processors causes the one or more processors to further perform the step of:
releasing a lock associated with the data block after the first record indicates that redo information associated with changes made to the data block has been replicated to the other sites of the plurality of sites.

49. The machine-readable medium of claim 44, wherein execution of the one or more sequences of instructions by the one or more processors causes the one or more processors to further perform the step of:
if a particular site of the plurality of sites becomes inoperable, then initiating recovery of the particular site after it is determined that all messages transmitted from the particular site to each other site of the plurality of sites have been received at their destination.

50. The machine-readable medium of claim 44, wherein execution of the one or more sequences of instructions by the one or more processors causes the one or more processors to further perform the steps of:
at each site of the plurality of sites, determining if a data structure is to be replicated to each other site of the plurality of sites; and
replicating the data structure to each other site of the plurality of sites unless it is determined that the data structure is not to be replicated to each other site of the plurality of sites.

51. The machine-readable medium of claim 44, wherein the record identifies which changes are made to the one or more data blocks stored at the first site have had associated redo information replicated to the other sites of the plurality of sites by identifying a portion of a redo log file, and wherein all changes in the identified portion of the redo log file have been replicated to the other sites of the plurality of sites.

52. A machine-readable medium carrying one or more sequences of instructions for mirroring data between a plurality of sites, wherein the plurality of sites includes a first site, wherein the machine-readable medium is one of a volatile medium or a non-volatile medium, wherein execution of the one or more sequences of instructions by one or more processors causes the one or more processors to perform the steps of:
at the first site, durably storing a data block prior to durably storing redo information about changes made to the data block; and
at the first site, durably storing the redo information after the changes have been replicated to the other sites in the plurality of sites.

53. The machine-readable medium of claim 52, wherein the data block is in a plurality of data blocks, wherein changes made to the plurality of data blocks are performed by transactions issued by a single process, and wherein execution of the one or more sequences of instructions by the one or more processors causes the one or more processors to further perform the step of:
determining if a set of transactions issued by the single process have completed, wherein the set of transactions made the changes to the plurality of data blocks.

54. The machine-readable medium of claim 52, wherein the data block is in a plurality of data blocks, wherein changes made to the plurality of data blocks are performed by transactions issued by two or more processes, and wherein execution of the one or more sequences of instructions by the one or more processors causes the one or more processors to further perform the step of:

determining when the changes have been replicated to the other sites in the plurality of sites.

55. The machine-readable medium of claim 52, wherein execution of the one or more sequences of instructions by the one or more processors causes the one or more processors to further perform the step of:

if a particular site of the plurality of sites becomes inoperable, then initiating recovery of the particular site after it is determined that all messages transmitted from the particular site to each other site of the plurality of sites have been received at their destination.

56. The machine-readable medium of claim 52, wherein execution of the one or more sequences of instructions by the one or more processors causes the one or more processors to further perform the steps of:

at each site of the plurality of sites, determining if a data structure is to be replicated to each other site of the plurality of sites; and replicating the data structure to each other site of the plurality of sites unless it is determined that the data structure is not to be replicated to each other site of the plurality of sites.

\* \* \* \* \*

UNITED STATES PATENT AND TRADEMARK OFFICE
CERTIFICATE OF CORRECTION

PATENT NO.       : 7,299,378 B2
APPLICATION NO.  : 10/759894
DATED            : November 20, 2007
INVENTOR(S)      : Chandrasekaran et al.

It is certified that error appears in the above-identified patent and that said Letters Patent is hereby corrected as shown below:

On the Title Page Item (56), under "Other Publications", line 1, delete "Dicitonary" and insert -- Dictionary --, therefor.

In column 1, line 7, after "10/760,013," insert -- 50277-2332, --.

In column 4, line 48, delete "hardware of software" and insert -- hardware or software --, therefor.

In column 10, line 11, delete "maybe" and insert -- may be --, therefor.

In column 13, line 13, after "that" delete "that".

In column 20, line 17, in Claim 24, delete "minoring" and insert -- mirroring --, therefor.

Signed and Sealed this

Twenty-first Day of October, 2008

JON W. DUDAS
*Director of the United States Patent and Trademark Office*